US007272797B1

(12) United States Patent
Kanevsky et al.

(10) Patent No.: US 7,272,797 B1
(45) Date of Patent: *Sep. 18, 2007

(54) SYSTEM AND METHOD FOR INFORMATION TRANSFER OVER A NETWORK

(75) Inventors: Dimitri Kanevsky, Ossining, NY (US); Clifford Alan Pickover, Yorktown Heights, NY (US); Wlodek Zadrozny, Tarrytown Heights, NY (US); Alexander Zlatsin, Yorktown Heights, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 500 days.

(21) Appl. No.: 09/343,758

(22) Filed: Jun. 30, 1999

(51) Int. Cl.
   *G06F 3/00* (2006.01)
(52) U.S. Cl. ...................... 715/748; 715/760
(58) Field of Classification Search ............ 345/716, 345/717, 719, 727, 728, 733, 740, 748, 751, 345/752, 760; 709/201, 203, 205, 217, 219; 707/501.1, 500.1, 513, 104.1; 715/501.1, 715/500.1, 513, 716, 717, 719, 727, 728, 715/733, 740, 748, 751, 752, 760
See application file for complete search history.

(56) References Cited

U.S. PATENT DOCUMENTS 5,671,156 A    9/1997  Weerackody et al. ......... 714/52
5,727,159 A    3/1998  Kikinis ....................... 709/246
5,913,029 A *  6/1999  Shostak ....................... 345/854
5,987,480 A * 11/1999  Donohue et al. ......... 707/505.1
6,233,600 B1*  5/2001  Salas et al. ................. 709/201

FOREIGN PATENT DOCUMENTS

EP   0 811 939 A2   4/1997
EP   0 811 939 A3   4/1997
FR   2 770 719 A1   10/1997

OTHER PUBLICATIONS

Phil James, Netscape Navigator 3.0, Ventana Communications Group, Imc., 1st Edition, pp. 337-379, copyright 1996.*
Search Report, Institut National de la Propierte Industrielle, Aug. 9, 2002.

* cited by examiner

Primary Examiner—Kieu D. Vu
(74) Attorney, Agent, or Firm—Law Office of Charles W. Peterson, Jr.; Louis J. Percello, Esq.; Satheesh K. Karra, Esq.

(57) ABSTRACT

An interface device for connecting to and retrieving data from a remote computer system, and method of compressing, decompressing and transferring data therefor. A user may set transfer constraints on the interface device. The interface device may be a web browser. The user selecting a web site requests data, normally image data from a remote computer system. The interface device includes a cache memory where generic objects may be stored. Each generic object corresponds to an original object in the requested data. Depending on the data transfer constraints, instead of retrieving the entire image, e.g., web page image, unaltered from the host system, a compact generic image is retrieved, initially, wherein generic objects are substituted for each corresponding original object. A pseudo-image is displayed, with the generic objects substituted for corresponding original objects. Subsequently received original objects may be substituted for generic objects as each original object is received.

8 Claims, 2 Drawing Sheets

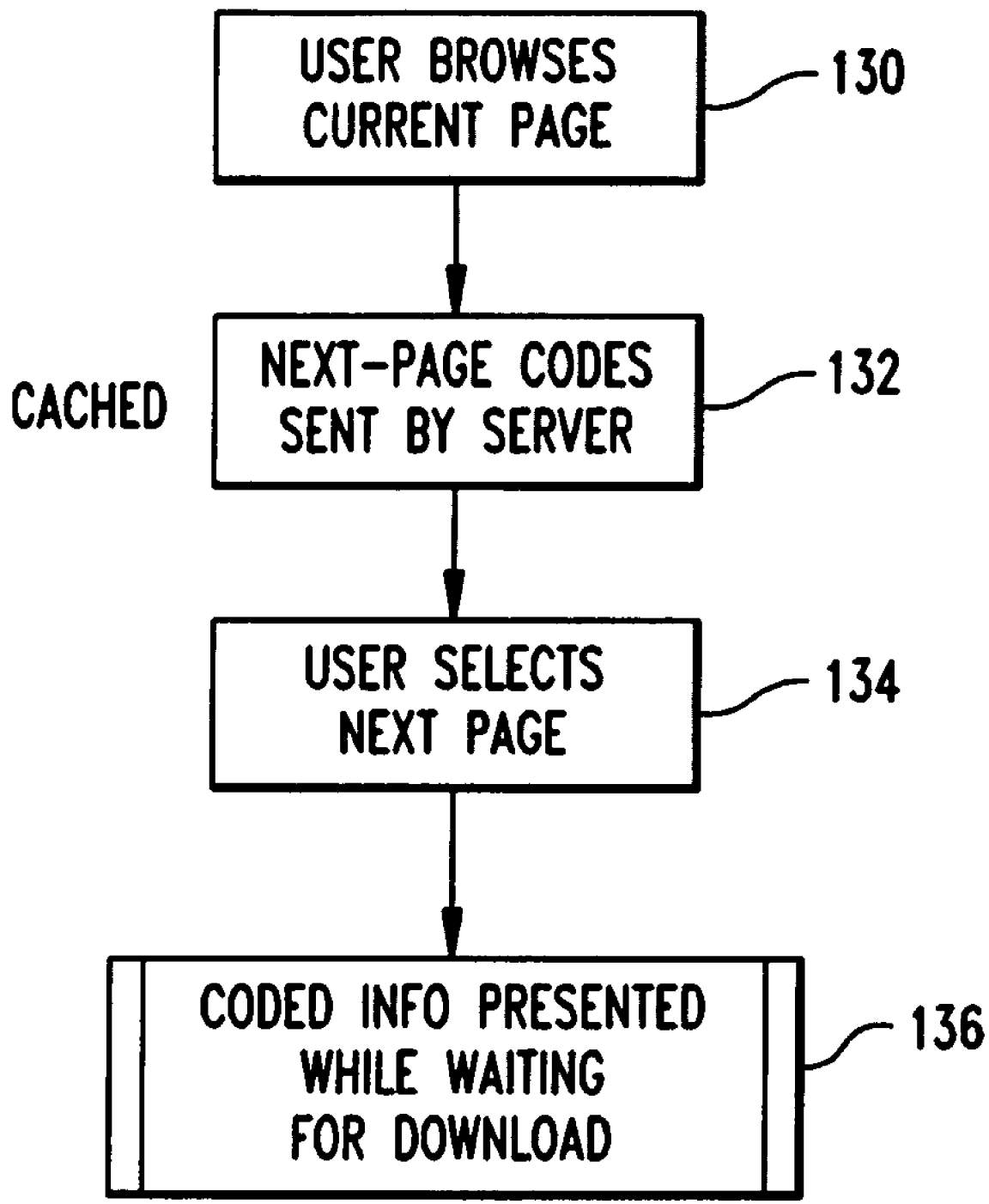

SYSTEM AND METHOD FOR INFORMATION TRANSFER OVER A NETWORK

BACKGROUND OF THE INVENTION

1. Field of the Invention

The present invention is related to transferring remotely stored data across a network and, more particularly, to transferring objects across a network to a local computer from a remotely connected computer and displaying the transferred data.

2. Background Description

Computers running software referred to as web browsers for connecting to a remote computer system, retrieving the contents of a database on the remote system and visually displaying the retrieved data on a local client system, are well known in the art. Typically, images are requested by a web browser user on a client computer system. The remote system receiving the request, retrieves the images from the database and transmits the images across what is commonly referred to as the internet or world wide web (www). The apparent speed of the transfer is directly proportional to the amount of data that must be transferred. Accordingly, to improve apparent transfer speed, reduce the amount of time that the user must wait for the transfer and to minimize web traffic congestion, data reduction or compression methods are constantly being sought.

Thus, there are various well known data reduction standards such as those referred to as JPEG, TIFF and GIF for images, MPEG for movies and RP3 for sound. However, even employing these well known standards, transferring data required to present a relatively simple image may cause a significant delay, thereby resulting in inactive or dead time at the client system. Accordingly, there is a need for data compression methods for improving internet image transfers.

SUMMARY OF THE INVENTION

It is a purpose of the invention to decrease net workload;

It is another purpose of the present invention to decrease apparent time required to pass information over a network;

It is yet another purpose of the present invention to decrease apparent time to load web pages while still maintaining page aesthetics;

It is yet another purpose of the present invention to off-load server storage of information.

The present invention is an interface device for connecting to and retrieving data from a remote computer system, and a method of compressing, decompressing and transferring data therefor. A user may set transfer constraints on the interface device. The interface device may be a web browser. The user selecting a web site requests data, often image data from a remote computer system. The interface device includes a cache memory where generic objects may be stored. Each generic object corresponds to an original object in the requested data. Depending on the data transfer constraints, instead of retrieving the entire image, e.g., web page image, unaltered from the host system, a skeletal image is retrieved, initially, wherein generic objects are substituted for each corresponding original object. A pseudo-image is displayed, with the generic objects substituted for corresponding original objects. Subsequently received original objects may be substituted for generic objects as each original object is received.

Additionally, as selected, a web page is displayed using generic codes previously cached in prior downloads. Thus, the generic coded information is made ready, but is not played or displayed until a link to the web page is selected. Upon link selection, the information is presented so that user observes it while waiting for the new page to be downloaded to the browser. This enhances web browser operation by causing the performance of useful or pleasing audio or images for the user during the wait period, that typically occurs between link selection and viewing, i.e., during downloading. The downloaded image may be a hypertext document represented by text or images. The codes may include wave files or other sound files such as rp3 files. Thus, generic codes for music, advertisements, copyright information, and the like may be included.

BRIEF DESCRIPTION OF THE DRAWINGS

The foregoing and other objects, aspects and advantages will be better understood from the following detailed description of a preferred embodiment of the invention with reference to the drawings, in which:

FIG. 2 shows normal browsing of a web site according to the preferred embodiment of the present invention.

DETAILED DESCRIPTION OF A PREFERRED EMBODIMENT OF THE INVENTION

Figure 1:
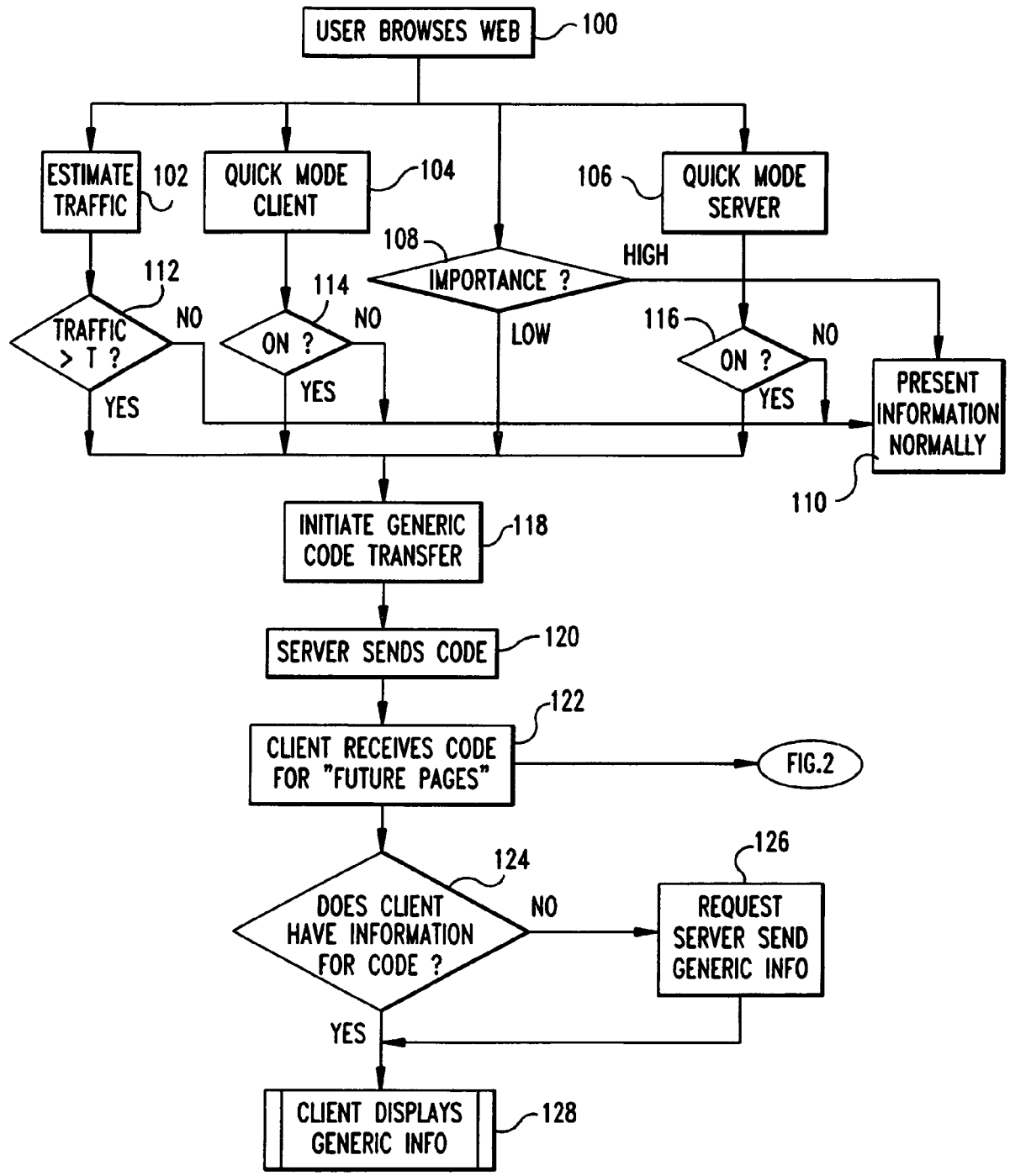
FIG. 1 is a flow diagram of the preferred embodiment system for sending, receiving and displaying Code over the internet.

As used herein, Information refers to images, audio, animations, 2-D and 3-D graphics, and other data transferred over a network; Generic Information refers to common or standard Information that usually resides on both a client system and a remote system; Code refers to text, numbers, or other compact identifiers for Generic Information. Further, Generic Information may be stored in a database on a compact disk (CD), digital versatile disk (DVD), a hard-disk, a company server or, an internet service provider (ISP) hub.

Generic Information may include sketches, clip art images, cartoons, commonly used images (e.g. forests, animals . . . ), melodic sequences, 3-D graphics for virtual reality environments, tactile information for virtual reality environments, wave files, etc. A Generic Information database is a library of numerous useful images and sound waveforms that might be supplied for example when a user purchases something on-line or downloads web pages on a web-browser.

Referring now to the drawings and, more particularly, FIG. 1 is a flow diagram of the preferred embodiment system for sending, receiving and displaying Code over the internet. Accordingly, in step 100, a user connects to a remote web site and begins browsing remote Information using a client web browser. Constraints may be placed on the web connection session by the user, the ISP, the remotely connected host, or internet related variables.

Accordingly, in step 102 the user may direct the client system to estimate network congestion by pinging the remote host on which the Information resides. Alternatively, the client web browser may generate an estimate concerning remote information access, generated by analyzing the user's past access times to the same remote host or, by considering other relevant parameters such as time of day or remote host's country of origin.

In parallel with the traffic estimation step 102, the browser or other related software is checked to determine whether the user has placed the client browser in quick mode in step 104. In quick mode, the browser is to present only Generic Information, making detailed information superfluous. Alternately, in step 106, the client may have been placed in quick mode by the ISP or, for example, by parental control software; or, the remote host server may limit transfers to sending Code, so as to reduce demand on the server.

It should be noted at the outset that, in step 100, the user may specify an importance level of Information to be requested. In this case, in step 108, the client system determines "importance" of the coded information. If the importance level is high, then, in step 110, the host server sends larger specific Information rather than Generic Information. Importance may determined by the user, the client, the ISP, the provider of the remote host Information, or determined by algorithm on the client system. For example, importance may be based on criteria such as the number of times the information has been accessed in the past, the subject matter type, specific instructions provided by web browser users or, latent semantic indexing.

If the importance of the requested Information is determined, as previously described, in step 108 to be high; or, based on the traffic estimation results in step 102, if network traffic is not congested in step 112; or, in step 114, it is determined that the user has not selected quick mode; or, in step 116, it is determined that the ISP or network conditions have not placed the browser in quick mode; then, in step 110, the browser presents the web page normally. If, however, network traffic is congested in step 112; or, the browser or server is in quick mode in steps 114 or 116, respectively; then, in step 118, a transfer is initiated for the Code for Generic Information rather than the larger more specific web site specific Information.

In step 120, the remote host server returns the more compact Code to client. The Generic Information specified by the Code may include object specific characteristics such as color as well as a particular object's location or a location relative to other Generic Information. Along with Code for the current web site image, in step 122, the client receives Generic Information Codes corresponding to related images, e.g., web pages linked to the current web page.

As the Code is received by the client, in step 124, the client system checks to determine whether the Code and any accompanying Information already exist in any local client database. Optionally, if the Code and Generic Information does not exist locally, then, in step 126, the client requests that server send Generic Information and Code to the client for current and future use. At the user's option, this step 126 may be ignored. Finally, in step 128, the client web browser presents the Generic Information (associated with Code) to the user.

The flow diagram of FIG. 2 shows normal browsing of a web site according to the preferred embodiment of the present invention. Once the current web page is loaded by the browser, in step 130, the user browses the displayed Information. Next, in step 132, while the current web page is browsed, the remote host server sends next page Codes, which are cached at the browser. Information corresponding to the concurrently received Code is not displayed nor otherwise performed at the browser, but merely cached for subsequent use. Then, in step 134, the user selects another linked page for browsing. As the host server is transmitting data for the selected web page, Generic Information corresponding to the previously cached Code may be displayed or performed in Step 136.

Thus, the Coded Information is played or displayed while waiting for the next page. Thus, the web browser operation is enhanced by providing pleasing audio, images or other Information, which the user observes during the normally dead period between linking to the web site and downloading all of the hypertext document as represented by text or images on the current web page. The Codes may be, for example, code for music, advertisements, copyright information, and the like. Other generic objects may include trees, roots, houses, a kitchen, a wall in a house, the side of a house, hotel, city, street, the sky or the sea.

EXAMPLES

A user, attempting to browse a remote web page, enters the page's URL into a web browser. The client system determines that the network is very congested in step 102 and, rather than download actual images from the remote host, selectively downloads a Generic Code for a generic image, which is subsequently displayed. So, in this example, while specific hyper text markup language (HTML)<img src="dog.jpg"> may specify a full image of a particular dog, <img srccode=2817> may specify the Code for a generic dog image, cached in a prior download or residing in the user's local database of Generic Information. The browser uses these codes to lookup generic images in the user's database and substitutes these when the web page is displayed.

In another example, a first user wishes to send a digital photo of himself standing in front of a beautiful mountain range; an advertiser wishes to send a photo of a new car in front of a starry sky. These users may specify a background scene using simple English, such as "mountains" or "starry sky." These English words are the Codes for generic images. Using image processing software, these specific foreground images may be merged with the specified generic code to create the final scene.

In yet another example, at 4:00 pm, a user participating in a virtual-reality chat room has audio, visual and tactile feedback. The chat room topic is kaleidoscopes. The user's system detects that exact tactile and audio components are unimportant to the chat. Additionally, it is the peak network traffic period, which causes receipt of a byte Code specifying Generic Information to be sent to the user. Responsive to the byte code, generic muzak is played while the user is presented with a generic oscillating sensation.

Accordingly, the present invention is applicable to network transfers on systems such as personal computers connected to an ISP server or any remote computer. Also, the present invention is advantageous for smaller computing devices where memory and display resources are a premium such as embedded devices, personal digital assistants (PDA), a web phone, a smart wallet, a digital pen, a camera and the like.

While the invention has been described in terms of preferred embodiments, those skilled in the art will recognize that the invention can be practiced with modification within the spirit and scope of the appended claims.

We claim:

1. A method of transferring data across a computer network, said computer network including a plurality of computers, a database stored on one of said plurality of computers, said method comprising the steps of:

requesting transfer of data stored on a remote computer system;

identifying at least one object included in said requested data as being associated with a generic object, wherein each said at least one object is a species object of its associated said generic object; and substituting a corresponding said generic object for each said associated at least one object, substituted said corresponding generic objects being transferred with said data before associated objects.

2. An interface device for connecting to and retrieving data from a remote computer system, said interface device comprising:

means for setting data transfer constraints;

means for requesting data from a remote computer system;

means for storing a plurality of generic objects, each stored generic object corresponding to an original object in data requested from said remote computer system, wherein each said corresponding original object is a species object of a corresponding said stored generic object;

means for substituting each stored said generic objects for said corresponding object; and means for outputting said requested data, said output data selectively including said generic objects or corresponding original objects responsive to said data transfer constraints.

3. A method of restoring a compressed image comprising the steps of:

a) identifying generic objects in received image data;
b) identifying corresponding objects in subsequently received data, wherein each of said corresponding objects is a species object of an identified one of said generic objects;
c) substituting said corresponding objects for said identified generic objects in said received image data to form an uncompressed image; and
d) displaying said uncompressed image.

4. A computer program product for transferring data across a computer network including a plurality of computers, a database stored on one of said plurality of computers, said computer program product comprising a computer usable medium having computer readable program code thereon, said computer readable program code comprising:

computer readable program code means for setting data transfer constraints;

computer readable program code means for requesting transfer of data stored on a remote computer system;

computer readable program code means for identifying at least one object included in said requested data as being associated with a generic object;

computer readable program code means for substituting generic objects in a web browser image for each of said at least one object responsive to said data transfer constraints;

computer readable program code for transferring additional generic objects associated with related images while the web browser image is being displayed; and computer readable program code for substituting said additional objects for said related object when a related image is displayed.

5. An interface device for connecting to and retrieving data from a remote computer system, said interface device comprising:

means for setting data transfer constraints;

means for requesting data from a remote computer system;

means for storing a plurality of generic objects, each stored generic object corresponding to an original object in data requested from said remote computer system;

means for substituting said each stored generic object for said corresponding object; and means for outputting said requested data, said output data selectively including said generic objects or corresponding original objects responsive to said data transfer constraints.

6. The interface device as in claim 5, wherein the outputting means is a video display.

7. The interface device as in claim 5, wherein the interface device is a speaker.

8. A method of restoring a compressed image comprising the steps of:

a) identifying generic objects in received image data;
b) identifying corresponding objects in subsequently received data;
c) substituting said corresponding objects for said identified generic objects in said received image data to form an uncompressed image; and
d) displaying said uncompressed image.

* * * * *